United States Patent [19]
Sonden et al.

[11] Patent Number: 5,405,174
[45] Date of Patent: Apr. 11, 1995

[54] KIT AND METHOD FOR PRODUCING A CONNECTOR FOR FLUID PIPE ELEMENTS

[75] Inventors: Carl-Gustaf Sonden, Angelholm; Kenneth Lennartsson, Torekov, both of Sweden

[73] Assignee: Lindab AB, Sweden

[21] Appl. No.: 45,629

[22] Filed: Apr. 9, 1993

[30] Foreign Application Priority Data

Mar. 1, 1993 [DK] Denmark ............................ 0228/93

[51] Int. Cl.⁶ ............................................. F16L 43/00
[52] U.S. Cl. ..................................... 285/183; 285/424
[58] Field of Search ....................... 285/179, 183, 424; 277/207 A; D23/262

[56] References Cited

U.S. PATENT DOCUMENTS

| | | | |
|---|---|---|---|
| 193,847 | 8/1877 | Choate | 285/183 |
| 210,367 | 11/1878 | Stern et al. | 285/183 |
| 244,720 | 7/1881 | Hildebrandt | 285/183 |
| 409,631 | 8/1889 | Cooper | 285/183 |
| 735,644 | 8/1903 | Wirtz | 285/424 |
| 904,199 | 11/1908 | Harris . | |
| 910,119 | 1/1909 | Dunn | 285/183 |
| 997,072 | 7/1911 | Mares . | |
| 1,083,002 | 12/1913 | Charls | 285/424 |
| 2,392,220 | 1/1946 | Bruhn et al. | 285/211 |
| 2,482,558 | 9/1949 | Scaringella | 285/183 |
| 2,823,703 | 2/1958 | Nusser, Jr. | 285/183 |
| 3,111,922 | 11/1963 | Hock | 285/183 |
| 3,290,066 | 12/1966 | Primich et al. | 285/183 |
| 4,050,703 | 9/1977 | Tuvesson et al. | 277/207 |
| 4,288,111 | 9/1981 | Feutz | 285/183 |
| 4,998,740 | 3/1991 | Tellier | 277/205 |
| 5,007,202 | 4/1991 | Guillon | 49/441 |

FOREIGN PATENT DOCUMENTS

| | | | |
|---|---|---|---|
| 363743 | 8/1981 | Austria . | |
| 13987 | 7/1973 | Sweden . | |
| 19819 | 6/1975 | Sweden . | |
| 17788 | 12/1975 | Sweden . | |
| 382675 | 2/1976 | Sweden . | |
| 25473 | 3/1979 | Sweden . | |
| 25610 | 8/1979 | Sweden . | |
| 26059 | 11/1979 | Sweden . | |
| 26995 | 11/1979 | Sweden . | |
| 840944 | 9/1984 | Sweden . | |
| 880780 | 3/1988 | Sweden . | |
| 317678 | 8/1929 | United Kingdom . | |
| 442751 | 2/1936 | United Kingdom . | |
| 1403744 | 8/1975 | United Kingdom | 285/183 |
| 1429220 | 3/1976 | United Kingdom | 285/183 |
| 2149040 | 6/1985 | United Kingdom . | |

OTHER PUBLICATIONS

Product Catalog entitled "Ducts and Fittings," issued by Lindab AB, Caswell Road, Brackmills Industrial Estate, Northampton NN4 OBR, England, 52 pages, first distributed in 1987.

Product Catalog entitled "Circular Duct System," issued by Lindab AB, Caswell Road, Brackmills Business Park, Northampton NN4 OPW, England, 42 pages, Mar. 1992.

Swedish-language Product Catalog entitled "VELO-DUCT Cirkulärt kanalsystem," issued by Fläkt VELO-DUCT AB, Prästgårdsvägen 15, Box 84, 153 00 Järna, Sweden, 29 pages, Jun. 1991.

Product literature entitled "SPIRO Bend Segment Cutting Machine I" issued by Spiro Investment AG, Industriestrasse, CH-3178 Boesingen, Switzerland, 2 pages, first distributed c. 1978.

(List continued on next page.)

*Primary Examiner*—Eric K. Nicholson
*Attorney, Agent, or Firm*—Weingarten, Schurgin, Gagnebin & Hayes

[57] ABSTRACT

A kit for producing a non-straight connector for fluid pipe element comprises loose sleeve couplings and at least one flat blank which has been given such a shape and such dimensions that, after forming thereof and interconnecting its opposite ends, it is connectable with the sleeve couplings by means of a peripheral joint, thereby forming an intermediate segment.

13 Claims, 9 Drawing Sheets

OTHER PUBLICATIONS

Product literature entitled "SPIRO Bend Segment Cutting Machine II" issued by SPIRO Investment AG, Industriestrasse, CH-3178 Boesingen, Switzerland, 6 pages, first distributed c. 1980.

German–language Product literature entitled "Kurven-schneidemaschine delta 2," issued by SUTER AG SEON, 5703 Seon/Schweiz, Switzerland, 6 pages, first distributed c. 1982.

Product literature entitled "Seam Forming and Locking Machine beta 2," issued by SUTER AG SEON, 5703 Seon/Schweiz, Switzerland, 4 pages, first distributed c. 1982.

Curve Cutting Machine Delta 2 issued by Emil Suter Maschinenfabrik AG, CH-5703 Seon/Schweiz (English translation).

Pipes by Solplast AB disclosed in a catalogue entitled "Svensk Byggkatalog Arp-87", issued by Svensk Byggtajanst in 1987.

Product NPU disclosed in a catalogue entitled "Ventilation-88", issued by Lindab AB in 1988.

Product ESIU disclosed in a catalogue entitled "Ventilation-88", issued by Lindab AB in 1988.

Product IK disclosed in a catalogue entitled "Ventilation-88", issued by Lindab AB in 1988.

General drawings No. J299102, producted by the Swedish company Flakt and dated Nov. 19, 1981 (811119).

Catalogue entitled "Kanalsystem VELODUCT", issued by Flakt in 1982.

U.S. Patent  Apr. 11, 1995  Sheet 1 of 9  5,405,174
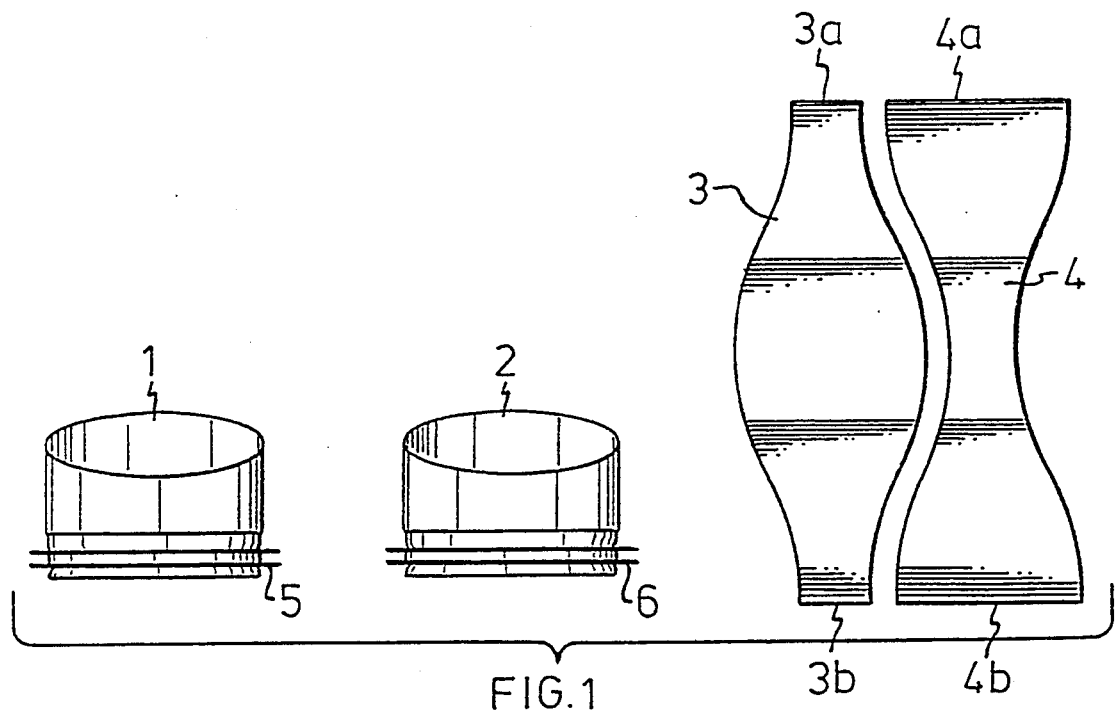
FIG. 1
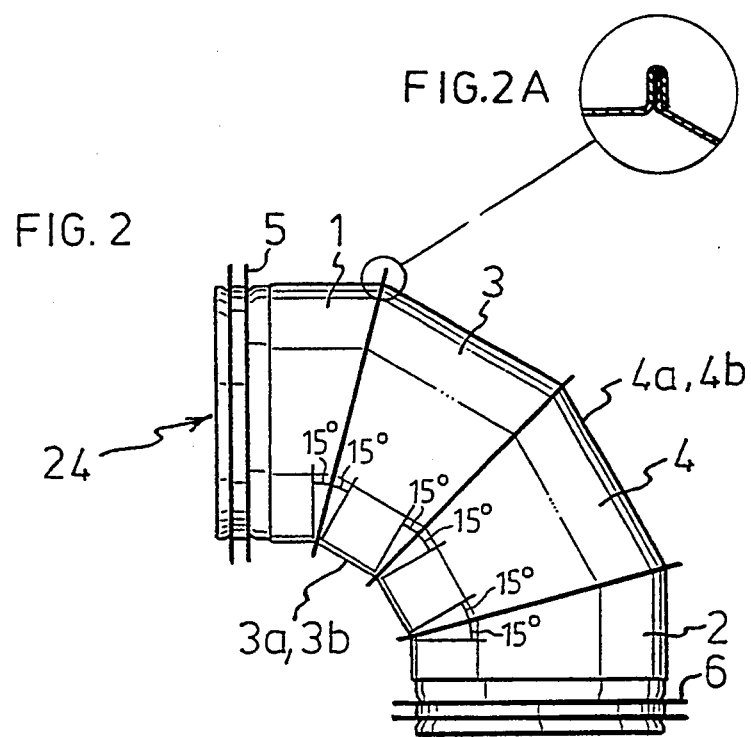
FIG. 2
FIG. 2A

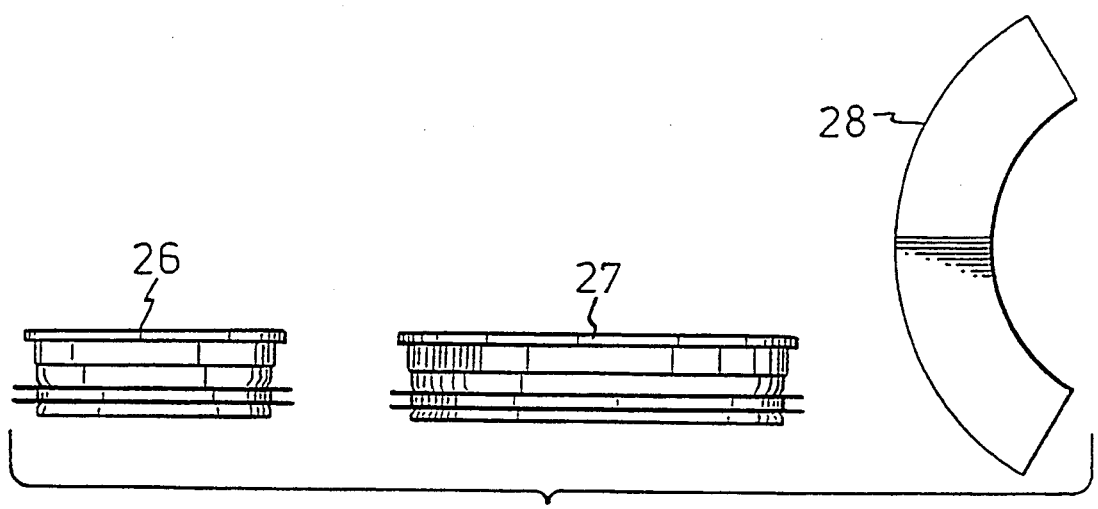
FIG. 9
FIG. 10
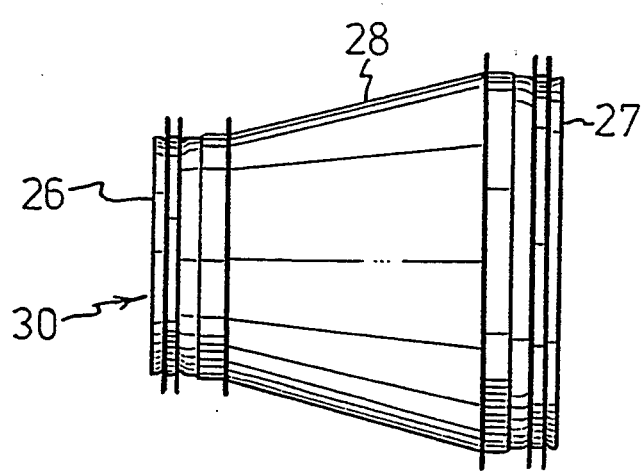

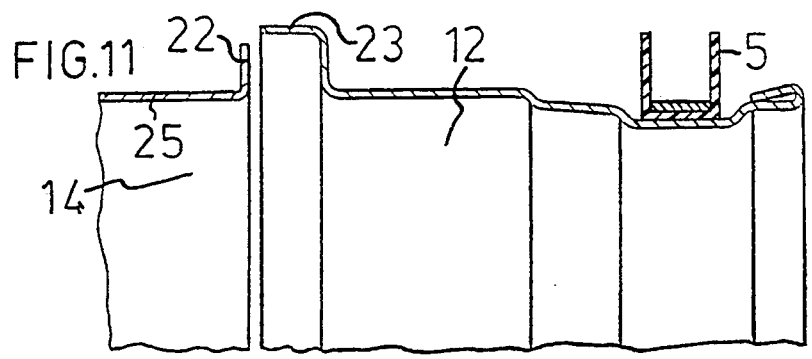
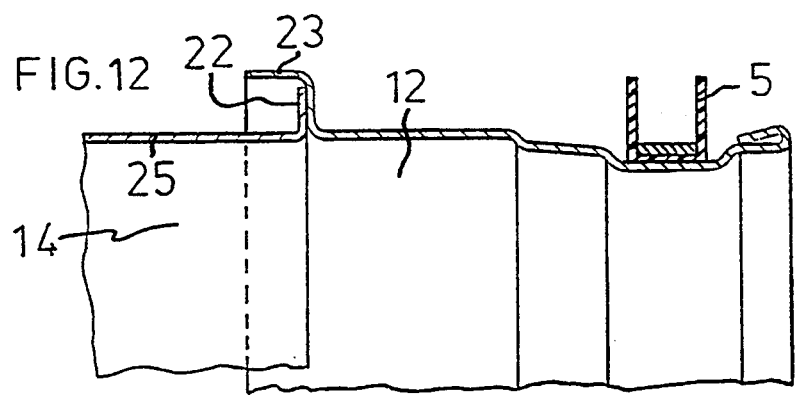
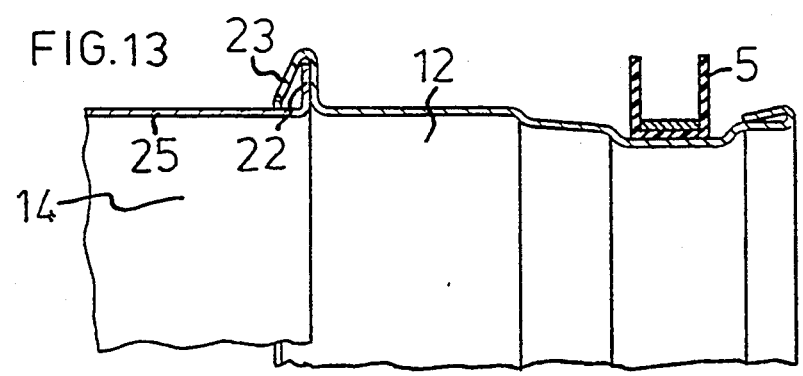
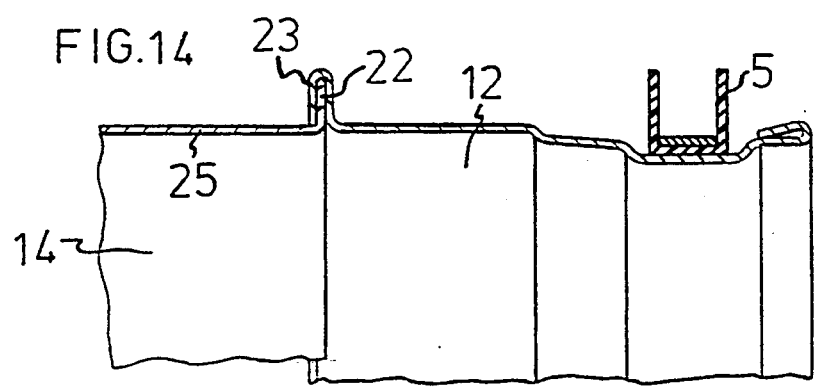

KIT AND METHOD FOR PRODUCING A CONNECTOR FOR FLUID PIPE ELEMENTS

FIELD OF THE INVENTION

The invention relates to a kit and a method for producing a non-straight connector or end piece for fluid pipe elements, inter alia for ventilation systems.

BACKGROUND OF THE INVENTION

Conventional ventilation duct systems are composed of elongate straight parts and a large number of different connectors and end pieces, such as pipe bends, T-pieces, end outlets etc., which allows the ducts to be laid in forms deviating from the straight form.

To make it possible to mount a ventilation duct system to suit its purpose, a great variety of connectors must be available. For example, pipe bends must be manufactured to have different angles, e.g. up to 90° in steps of 15°, which means that a very great number of variants must be manufactured in advance and stored, thus implying heavy capital expenditure for stock-keeping.

Moreover, the finished connectors are relatively bulky to store and transport, which also results in high costs.

An object of the invention is to provide a solution to these problems.

SUMMARY OF THE INVENTION

According to the invention, the object is achieved by means of a kit which is of the type mentioned by way of introduction and which comprises loose sleeve couplings and at least one flat blank which has been given such a shape and such dimensions that, after forming thereof and interconnecting its two opposite ends, it is connectable with said sleeve couplings by means of a peripheral joint, thereby forming an intermediate segment. Preferred embodiments of the invention have the features recited in the appended claims.

The present invention brings the advantage that the number of standard products in stock is reduced since a limited amount of variants of sleeve couplings and intermediate segments can be combined to form many different connectors and end pieces.

The sleeve couplings and flat elements included in the kit are made of metal sheet, preferably pregalvanized metal sheet when ventilation systems are involved. The flat elements are formed by bending or rolling, and their opposite ends are interconnected, preferably by welding. The formed elements are connected with the sleeve couplings and with each other preferably by means of folded seams. Their number is at least one and sufficiently many to form, together with the sleeve couplings, the connector, with no further deforming working thereof than the above-mentioned forming, preferably bending/rolling. A 90° pipe bend thus requires at least two sheet-metal elements. The cutting-out of flat sheet-metal elements from metal sheeting is advantageously carried out in such a manner that the cut-out sheet-metal elements supplement each other, which of course results in optimal utilization of the metal sheeting.

Some embodiments of the invention will now be described in more detail, reference being made to the accompanying schematic drawings.

BRIEF DESCRIPTION OF THE DRAWINGS

FIG. 1 is a side view of two sleeve couplings and a top plan views of two flat elements;

FIG. 2 is a side view of an assembled pipe bend with a 90° change of angle;

FIG. 2A is a detail view of a portion of the assembled pipe shown in FIG. 2;

FIG. 9 is a side view of two sleeve couplings of different sizes and a top plan view of a flat element;

FIG. 10 is a side view of an assembled so-called reducer;

FIGS. 11–14 illustrate the connection between a sleeve coupling and an intermediate segment by means of a folded seam;

DESCRIPTION OF A PREFERRED EMBODIMENT

Figure 3:
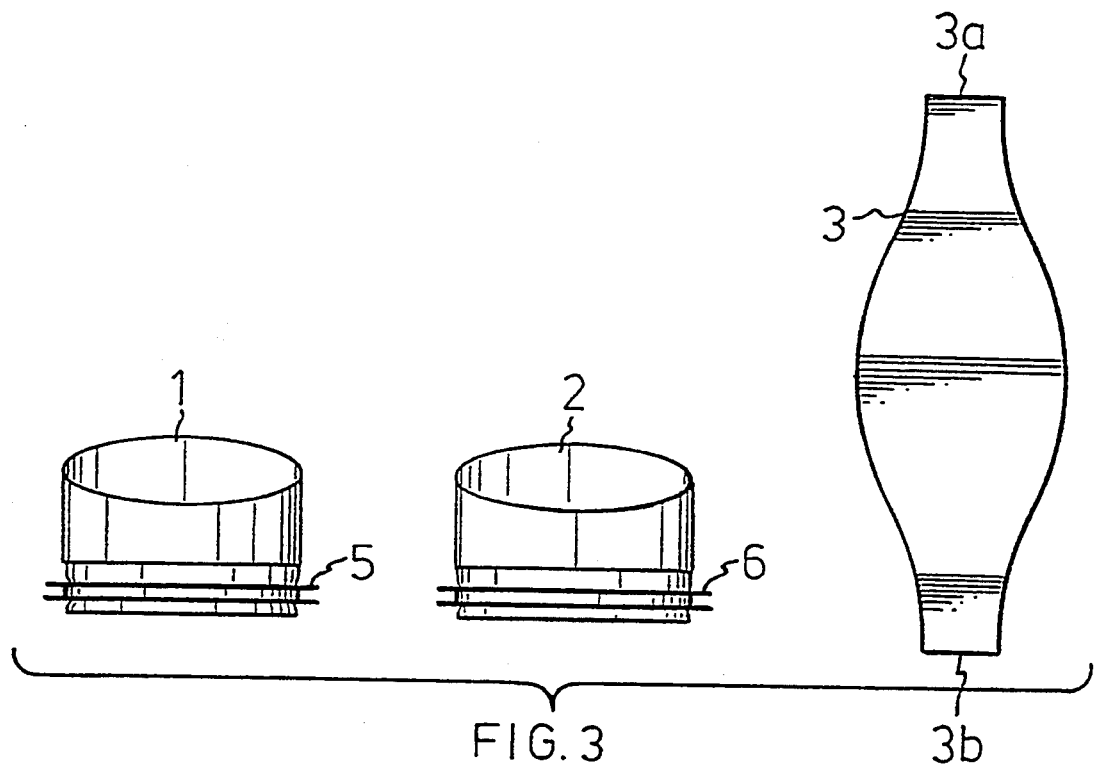
FIG. 3 is a side view of two sleeve couplings and a top plan view of a flat element.

FIG. 1 illustrates the components of a kit adapted to form a non-straight connector, in this case in the form of a pipe bend 24 for conducting a fluid, which is shown in FIG. 2. The separate components are two identical, substantially circular sheet-metal end sleeve couplings 1, 2 for connecting the pipe bend 24 with further fluid-conducting elements (not shown), and two flat blanks or sheet-metal elements 3, 4 supplementing one another. After the operations described in the Summary of the Invention, i.e., bending or rolling the blanks, and interconnecting the ends thereof, the blanks or sheet-metal elements are connectable with each other and with the circular sleeve couplings 1, 2 in the manner shown for delimiting a duct and, thus, for forming the pipe bend 24. The opposite ends 3a, 3b and 4a, 4b of the blanks 3, 4 are preferably welded together. The weld joints 3a, 3b and 4a, 4b are shown in FIG. 2. The pipe bend 24 has a change of angle from one sleeve coupling to the other, i.e. it forms an angle of 90°. All so-called segment angles are 15°. After forming and being connected by a folded seam, the two originally flat blanks 3, 4 form intermediate segments of the pipe bend 24.

The sleeve couplings 1, 2 are each fitted with an external peripheral, elastic sealing ring 5, 6 which preferably is substantially U-shaped in cross-section, a so-called double lip seal, the web of which is fixed to the outside of the sleeve couplings 1, 2. The sealing rings 5, 6 establish a seal between the sleeve couplings 1, 2 and the above-mentioned further fluid-conducting elements. This type of seal and tubular connections generally are disclosed in U.S. Pat. No. 4,050,703 to Tuvesson et al.

Figure 4:
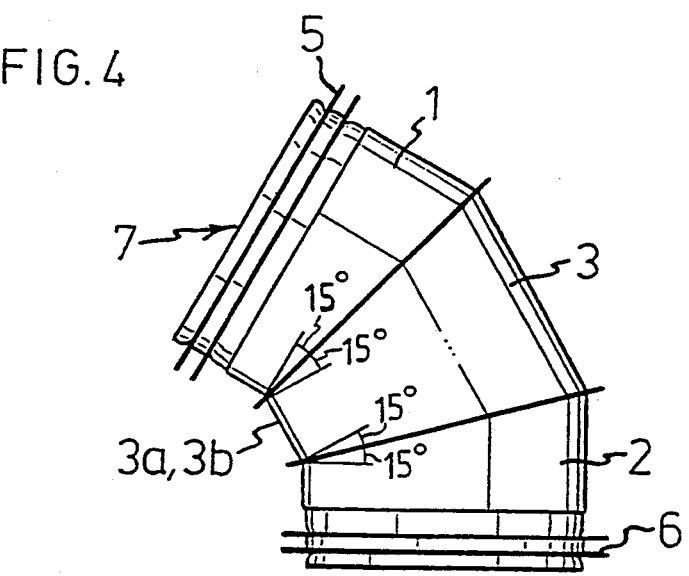
FIG. 4 is a side view of an assembled pipe bend with a 60° change of angle.

FIG. 3 illustrates the same end sleeve couplings 1, 2 and the same, originally flat blanks 3, the components 1, 2, 3 producing the 60° pipe bend 7 illustrated in FIG. 4. It should be noted that also the flat blank 4 in FIG. 1 can be used to produce the 60° pipe bend in FIG. 4. The weld joint is then diametrically opposed to the joint shown in FIG. 4 (cf. FIG. 2).

Figure 5:
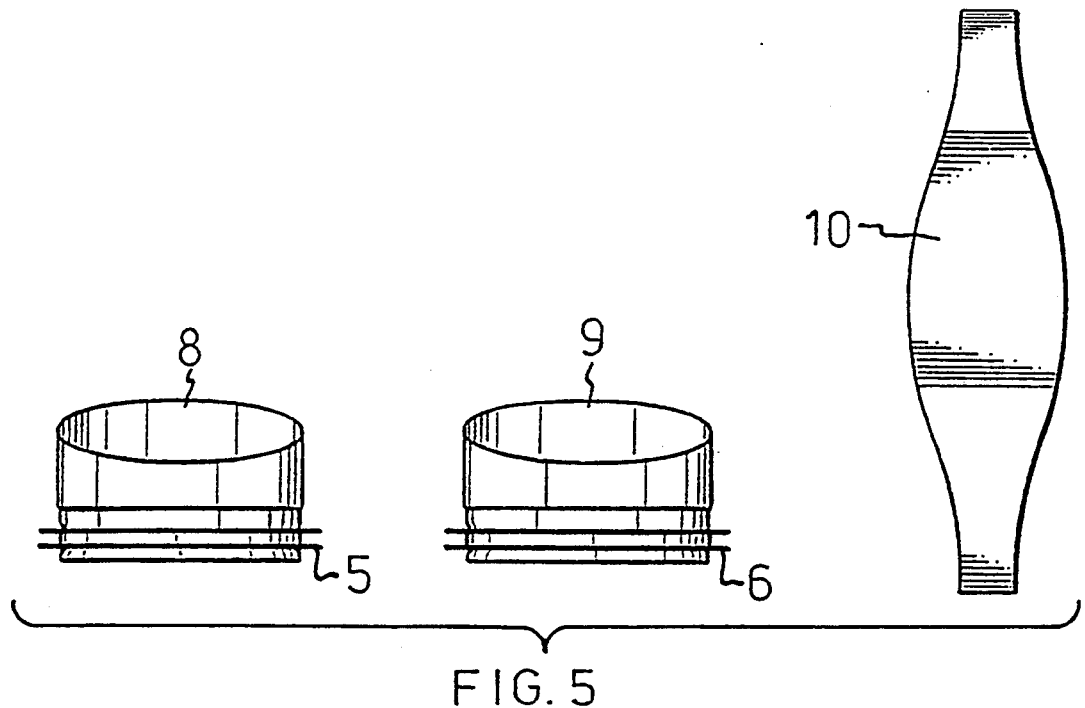
FIG. 5 is a side view of two sleeve couplings and a top plan view of a flat element.
Figure 6:
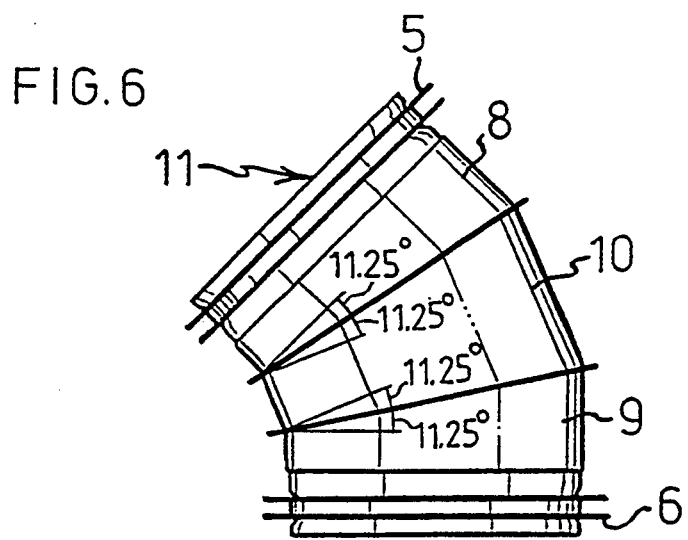
FIG. 6 is a side view of an assembled pipe bend with a 45° change of angle.

FIG. 5 illustrates end sleeve couplings 8, 9 which are of a slightly smaller height than the sleeve couplings 1, 2 and which are connectable with an originally flat intermediate segment 10 for forming a 45° pipe bend 11 as shown in FIG. 6. The pipe bend 11 has 11.25° segment angles. Thus, the dimensions of the intermediate segment 10 are different from those of the intermediate segment 3 in FIGS. 2 and 3.

Figure 7:
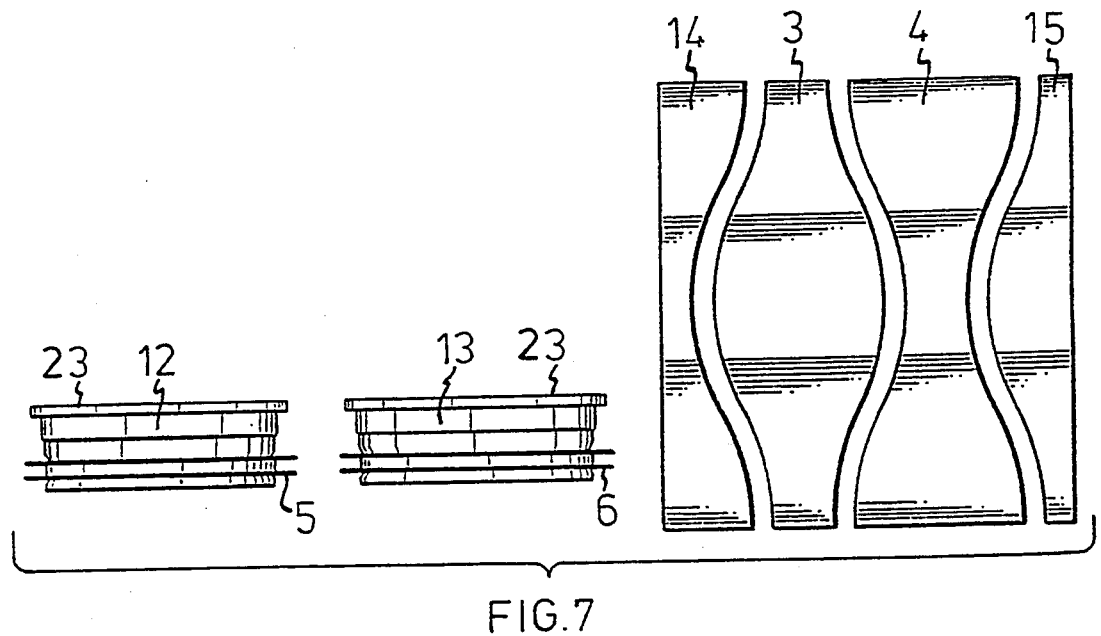
FIG. 7 is a side view of two sleeve couplings and a top plan view of four flat elements.
Figure 8:
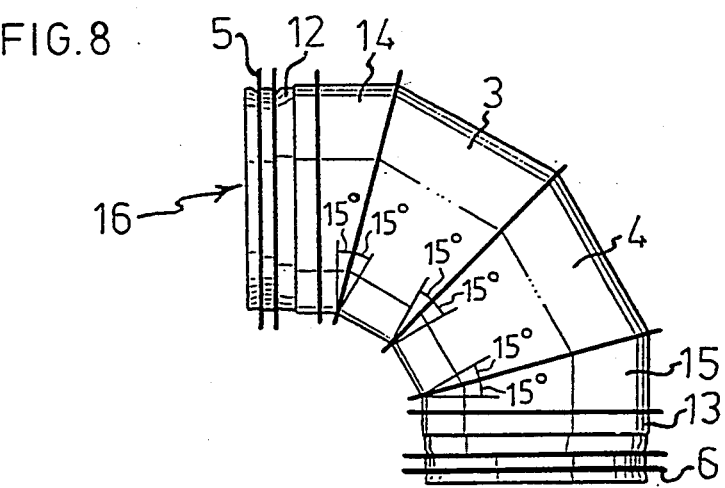
FIG. 8 is a side view of an assembled pipe bend, corresponding to the one shown in FIG. 2.

FIG. 7 shows an alternative embodiment of the kit in FIG. 1 for producing a 90° pipe bend 16 as shown in FIG. 8. The components of the kit comprise two differently shaped end sleeve couplings 12, 13 and four flat blanks or sheet-metal elements 14, 3, 4, 15 which are connectable with each other to form intermediate segments, and with the sleeve couplings 12, 13 to form the pipe bend 16. In this case, the sleeve couplings 12, 13 are not beveled. To facilitate the connection with the sleeve couplings 12, 13, they are here provided with a collar 23. The flat elements and the intermediate segments 3, 4 are identical with the flat segments and the intermediate segments illustrated in FIGS. 1 and 2.

FIG. 9 illustrates a kit for producing a connector 30 of decreasing cross-section, a so-called reducer that is illustrated in FIG. 10. To this end, the sleeve couplings 26, 27 are of different diameters, and the curvature of the flat element 28 (shown on a smaller scale) is adapted thereto.

Figure 10A:
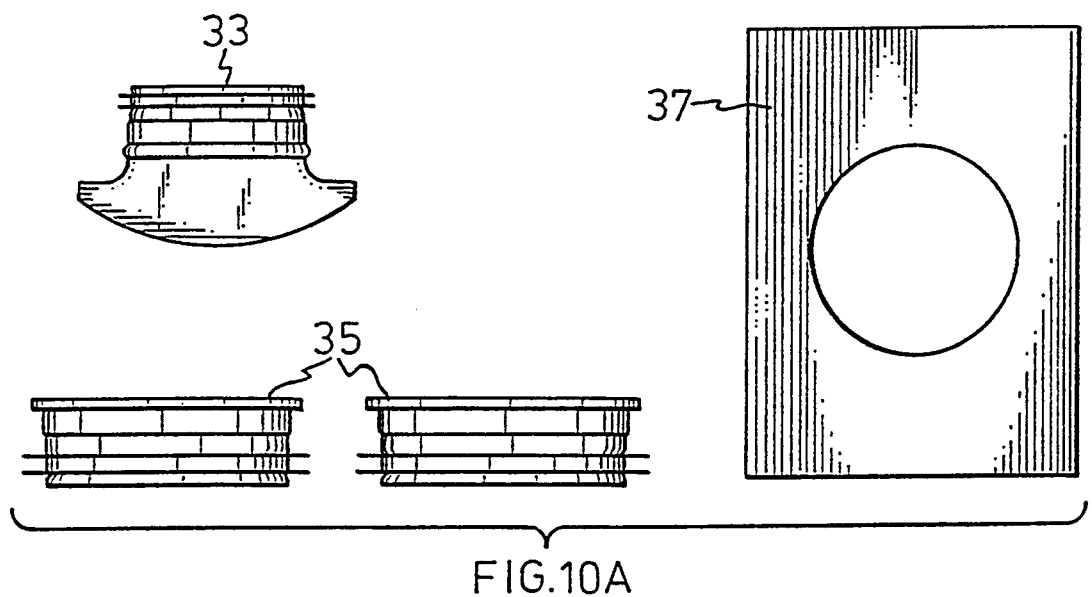
FIGS. 10A and 10B illustrate a T-connector and a kit for producing the same.
Figure 10B:
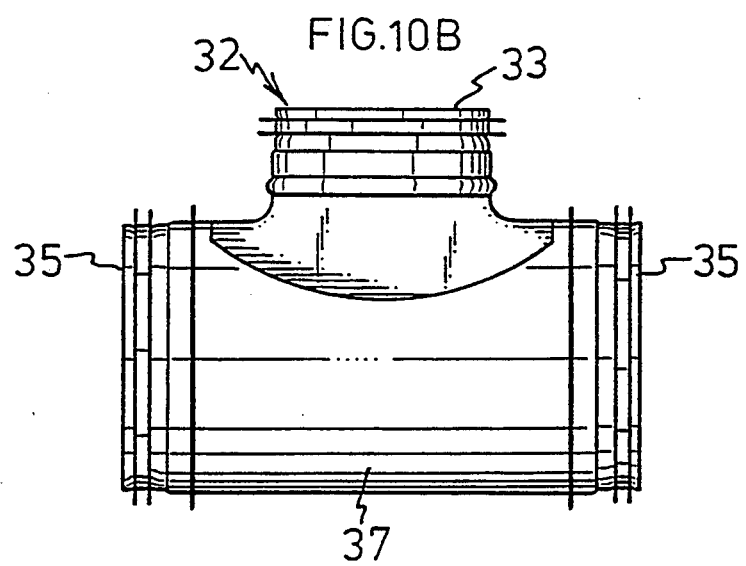
Figure 10C:
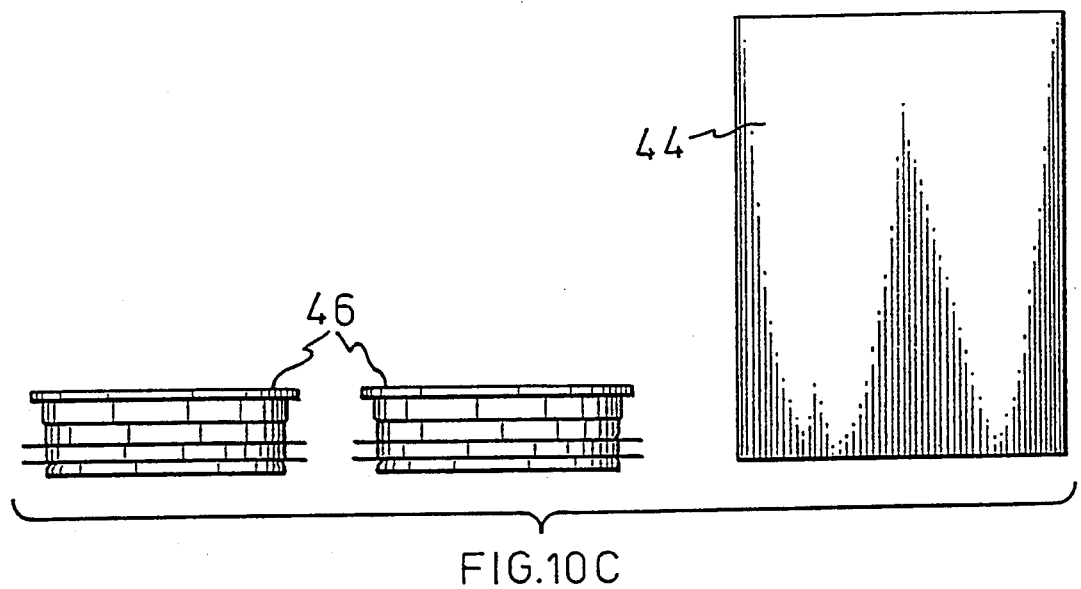
FIGS. 10C and 10D illustrate a straight connector and a kit for producing the same.
Figure 10D:
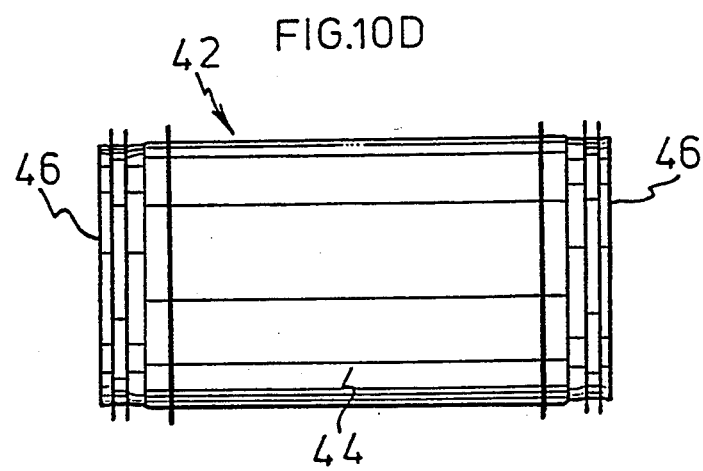

FIG. 10A and 10B illustrate a T-connector 32, having two end sleeve couplings 35 secured to an intermediate segment 37 using a folding machine or other connection method known in the art. As in the other embodiments, the intermediate segment 37 is formed by shaping a blank, so that a third opening is provided for mating with the third or central sleeve coupling 33. FIG. 10C and 10D illustrate another configuration, a straight connector 42, having a straight or uniform diameter intermediate segment 44 with sleeve couplings 46 at each end.

FIGS. 11-14 show the folding operation which can be used to connect two separate components in the kit with each other. FIG. 11 illustrates the sleeve coupling 12 and the intermediate segment 14 formed to a circle, before being connected with one another. The edge portion of the intermediate segment 14 is bent outward by a folding machine from the circumferential surface 25 of the pipe bend, essentially at right angles thereto, thereby forming a flange 22. The metal is not split during bending or folding because the deformation does not exceed the breaking strength of the material. The end of the sleeve coupling 12 facing away from the end supporting the seal 5 is now collared with the folding machine, but by means of other rollers which are arranged in a manner for forming the collar, if this has not been done before, cf. FIG. 7, for a folded seam connection with the intermediate segment 14. The flange 22 is caused to engage that part of the collar 23 which extends substantially in parallel with the flange 22, cf. FIG. 12, by axial displacement of the segment 14 or the sleeve coupling 12. Subsequently, that part of the collar 23 which extends substantially at right angles to the flange 22 and around the same is bent in a folding machine using rollers and clamped against the flange 22 to form a reliable and tight peripheral joint. It will be appreciated that the folded seam connection may be "reversed", i.e. the collar is formed on the intermediate segment, while the sleeve coupling is formed with a radially projecting flange.

Figure 15:
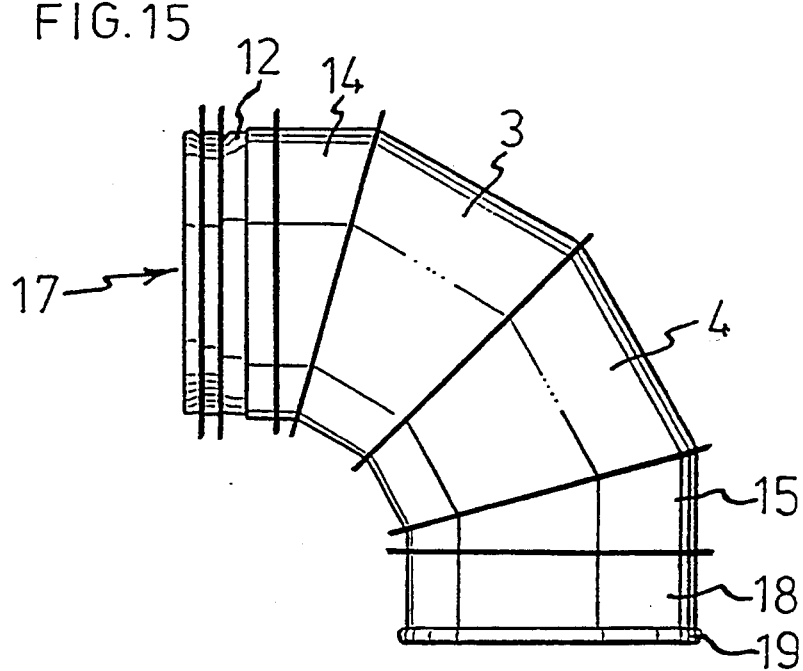
FIG. 15 is a side view of an assembled pipe bend with a 90° change of angle.
Figure 16:
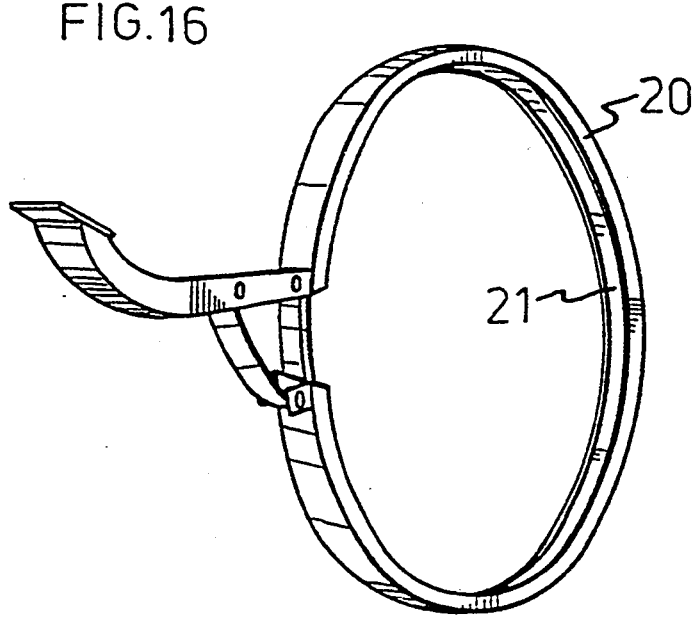
FIG. 16 is a perspective view of a connection device.

FIG. 15 shows a pipe bend 17 which is composed of the end sleeve coupling 12, the four intermediate segments 14, 3, 4, 15, and a sleeve coupling 18 whose one end is provided with a peripheral end bead 19 for engaging a detachable, external connecting device 20 which is illustrated in FIG. 16 and which is adapted to connect the sleeve coupling 18 with a further fluid-conducting element formed with a similar end bead. The connection device 20 is further fitted with a peripheral internal seal 21.

GENERAL ADVANTAGES AND ALTERNATIVE EMBODIMENTS

According to the invention, a number of advantages are obtained, some of which have been discussed in the introductory part of the specification. If the kit is used to produce connectors for ventilation duct systems, particular advantages are obtained. Conventional connectors of this type can be hot-dip galvanized, which means that the peripheral groove in which the seal is to be arranged, must be formed before the hot-dip galvanizing, since the zinc layer would otherwise crack and scale off in the area that is worked. Such hot-dip galvanizing also results in the zinc layer partly filling the groove formed, thus reducing the space intended for the seal, which in turn causes problems when assembling the connector and a further pipe element. By means of the kit according to the invention, these drawbacks are obviated, since the sleeve couplings can be manufactured of metal sheeting which is pregalvanized in a manner that allows working in the form of e.g. roll-forming of the groove.

A further problem in conventional manufacture of connectors for ventilation duct systems is that in some cases the connector must be subjected to relative extensive working during the manufacture, in which the material hardens, implying that it will be difficult to form the groove in which the seal is to be arranged. During the forming, some portions of the groove frequently grow in an uncontrollable matter. Moreover, there is a risk that the material cracks in the transition zone between the groove and an adjoining straight part of the connector. Also this inconvenience will be obviated by means of the kit according to the invention, since the sleeve couplings included therein can be manufactured separately from a material which is easy to work and which requires neither e.g. pressure turning nor pressing, prior to the forming of the groove.

The concept of the invention provides high flexibility since the sleeve couplings and blanks can be manufactured separately and, if suitable, in different factories. The blanks can be stored and transported in their flat state and then require but a small space, thus reducing the costs. The invention also creates the possibility of producing the finished products (pipe bends, T-pieces etc.) in connection with the site where the ventilation system is to be installed.

Finally, it should be emphasized that the invention is in no way restricted to the embodiments described above, but several modifications are feasible within the scope of the inventive idea defined in the accompanying claims. It should be particularly emphasized that the inventive concept is applicable to many different types of connectors and similar components.

What is claimed is:

1. A kit for producing a connector for connecting a first fluid-conducting element to a second fluid-conducting element and permitting passage of a fluid from said first fluid-conducting element to said second fluid-conducting element, comprising:

at least one flat blank having a first end connectable to a second end to form a cylindrical segment, a first segment end, and a second segment end, each said segment end having a smooth cylindrical shape and defining an opening in said cylindrical segment;

a first cylindrical sleeve coupling having a first sleeve coupling end and a second sleeve coupling end, each said sleeve coupling end defining an opening in said first cylindrical sleeve coupling, said first sleeve coupling end having a smooth cylindrical shape to accommodate juncture with said first segment end, and said second sleeve coupling end including one of an external peripheral elastomeric sealing element and an external peripheral bead matable with said first fluid-conducting element; and a second cylindrical sleeve coupling having a first sleeve coupling end and a second sleeve coupling end, each said sleeve coupling end defining an opening in said second cylindrical sleeve coupling, said first sleeve coupling end of said second sleeve coupling having a smooth cylindrical shape to accommodate juncture with said second segment end, and said second sleeve coupling end of said second sleeve coupling including one of an external peripheral elastomeric sealing element and an external peripheral bead matable with said second fluid-conducting element.

2. A kit for producing an angled connector for connecting a first fluid-conducting element to a second fluid-conducting element at a predetermined angle and permitting passage of a fluid from said first fluid-conducting element to said second fluid-conducting element, comprising:

at least one flat blank having a first end connectable to a second end to form a cylindrical segment having a central axis, a first segment end, and a second segment end, each said segment end having a smooth cylindrical shape and defining an opening in said cylindrical segment, said opening in at least one said segment end defining a plane that is not orthogonal to said central axis;

a first cylindrical sleeve coupling having a first sleeve coupling end and a second sleeve coupling end, each said sleeve coupling end defining an opening in said first cylindrical sleeve coupling, said first sleeve coupling end having a smooth cylindrical shape to accommodate juncture with said first segment end, and said second sleeve coupling end including one of an external peripheral elastomeric sealing element and an external peripheral bead matable with said first fluid-conducting element; and a second cylindrical sleeve coupling having a first sleeve coupling end and a second sleeve coupling end, each said sleeve coupling end defining an opening in said second cylindrical sleeve coupling, said first sleeve coupling end of said second sleeve coupling having a smooth cylindrical shape to accommodate juncture with said second segment end, and said second sleeve coupling end of said second sleeve coupling including one of an external peripheral elastomeric sealing element and an external peripheral bead matable with said second fluid-conducting element.

3. The kit of claim 2, wherein said cylindrical segment comprises a plurality of flat blanks, each said flat blank formable into an intermediate cylindrical segment having a smooth cylindrical shape to accommodate juncture with an adjacent intermediate cylindrical segment.

4. The kit of claim 2, wherein said sealing element is U-shaped and projects radially from said second sleeve coupling end.

5. The kit of claim 2, wherein at least one of said first and said second segment end further comprises a radially projecting flange.

6. The kit of claim 5, wherein at least one said first sleeve coupling end of said first and second cylindrical sleeve coupling is adapted to be edge formed with said radially projecting flange.

7. The kit of claim 6, wherein said at least one said first sleeve coupling end of said first and second cylindrical sleeve coupling is crimped over said radially projecting flange.

8. The kit of claim 2, wherein said at least one said first sleeve coupling end of said first and second cylindrical sleeve coupling is adapted to be bonded to one of said first and second segment end.

9. The kit of claim 8, wherein said bonding includes folding.

10. The kit of claim 8, wherein said bonding includes welding.

11. The kit of claim 2, wherein said first fluid-conducting element is a pipe.

12. The kit of claim 2, wherein said first fluid-conducting element is a ventilation duct.

13. The kit of claim 2, wherein said at least one flat blank is made of sheet metal.

* * * * *